(12) United States Patent
Frank et al.

(10) Patent No.: US 9,110,914 B1
(45) Date of Patent: Aug. 18, 2015

(54) CONTINUOUS DATA PROTECTION USING DEDUPLICATION-BASED STORAGE

(71) Applicant: EMC Corporation, Hopkinton, MA (US)

(72) Inventors: Shahar Frank, Ramat Hasharon (IL); Assaf Natanzon, Tel Aviv (IL); Jehuda Shemer, Kfar Saba (IL)

(73) Assignee: EMC Corporation, Hopkinton, MA (US)

( * ) Notice: Subject to any disclaimer, the term of this patent is extended or adjusted under 35 U.S.C. 154(b) by 260 days.

(21) Appl. No.: 13/827,959

(22) Filed: Mar. 14, 2013

(51) Int. Cl.
*G06F 17/30* (2006.01)

(52) U.S. Cl.
CPC ................... *G06F 17/30156* (2013.01)

(58) Field of Classification Search
CPC ............ G06F 17/30156; G06F 17/30489; G06F 17/30492; G06F 17/30159
USPC ........................................................ 707/692
See application file for complete search history.

(56) References Cited

U.S. PATENT DOCUMENTS

| | | | |
|---|---|---|---|
| 5,170,480 A | 12/1992 | Mohan et al. |
| 5,388,254 A | 2/1995 | Betz et al. |
| 5,499,367 A | 3/1996 | Bamford et al. |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,076,620 B2 | 7/2006 | Takeda et al. |
| 7,111,197 B2 | 9/2006 | Kingsbury et al. |
| 7,117,327 B2 | 10/2006 | Hirakawa et al. |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Microsoft Computer Dictionary, 2002 Press Fifth Edition, p. 58.

(Continued)

*Primary Examiner* — Cam-Y Truong
(74) *Attorney, Agent, or Firm* — Daly, Crowley, Mofford & Durkee, LLP

(57) ABSTRACT

In one aspect, a method includes intercepting a write I/O to a first storage volume of a first storage array having a deduplication-based storage functionality, sending metadata and a signature to a replication data protection appliance and increasing a first reference count representing the data in the write I/O stored at the first storage array if the signature is written to the first journal.

19 Claims, 7 Drawing Sheets

(56) References Cited

U.S. PATENT DOCUMENTS

| | | |
|---|---|---|
| 7,120,768 B2 | 10/2006 | Mizuno et al. |
| 7,130,975 B2 | 10/2006 | Suishu et al. |
| 7,139,927 B2 | 11/2006 | Park et al. |
| 7,146,439 B1 | 12/2006 | Ofer et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,737 B2 | 2/2008 | Kawamura et al. |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,628 B1 | 4/2009 | Honami et al. |
| 7,546,485 B2 | 6/2009 | Cochran et al. |
| 7,577,867 B2 | 8/2009 | Lewin et al. |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,769,931 B1 | 8/2010 | Angelone et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,904,681 B1 | 3/2011 | Bappe et al. |
| 7,908,515 B1 | 3/2011 | Schechner et al. |
| 7,934,262 B1 | 4/2011 | Natanzon et al. |
| 7,945,640 B1 | 5/2011 | Van Tine |
| 7,958,372 B1 | 6/2011 | Natanzon |
| 7,962,567 B1 | 6/2011 | Sandstrom et al. |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,140,821 B1 | 3/2012 | Raizen et al. |
| 8,150,936 B2 | 4/2012 | Liu et al. |
| 8,166,314 B1 | 4/2012 | Raizen et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 2002/0129168 A1 | 9/2002 | Kanai et al. |
| 2003/0061537 A1 | 3/2003 | Cha et al. |
| 2003/0110278 A1 | 6/2003 | Anderson |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0266053 A1 | 11/2007 | Ahal et al. |
| 2008/0082592 A1* | 4/2008 | Ahal et al. ............ 707/204 |
| 2010/0223495 A1* | 9/2010 | Leppard ............... 714/6 |
| 2014/0201171 A1* | 7/2014 | Vijayan et al. ........ 707/692 |

OTHER PUBLICATIONS

Soules et al.; "Metadata in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045,946, 14 pages.

Office Action dated Jan. 23, 2012, U.S. Appl. No. 12/818,236, 17 Pages.

Soules, Metadata Efficiency in Versioning File Systems, 2003, pp. 1-16.

AIX System Management Concepts: Operating Systems and Devices May 2000, pp. 1-280.

Office Action dated Mar. 31, 2009 for U.S. Appl. No. 11/609,560, 15 pages.

Response to Office Action filed Jun. 10, 2009 in U.S. Appl. No. 11/609,560, 18 pages.

Office Action dated Oct. 21, 2009 for U.S. Appl. No. 11/609,560, 34 pages.

(56) References Cited

OTHER PUBLICATIONS

Response to Office Action filed Jan. 14, 2010 in U.S. Appl. No. 11/609,560, 16 pages.
Notice of Allowance dated Sep. 27, 2011 for U.S. Appl. No. 11/609,560, 13 pages.
Office Action dated Aug. 17, 2011 for U.S. Appl. No. 12/057,652, (Atty. Dkt, No. Emc-054BUS), 19 pages.
Response to Office Action filed on Sep. 1, 2011 in U.S. Appl. No. 12/057,652, 9 pages.
Notice of Allowance dated Sep. 27, 2011 for U.S. Appl. No. 12/057,652, 8 pages.
Office Action dated Jun. 11, 2009 for U.S. Appl. No. 11/609,561 7 pages.
Response to Office Acfion filed on Sep. 16, 2009 in U.S. Appl. No. 11/609,561 12 pages.
Office Action dated Jan. 11, 2010 for U.S. Appl. No. 11/809,581 10 pages.
Pre-Appeal Brief Request for Review filed Mar. 25, 2010 in U.S. Appl. No. 11/609,561 6 pages.
Notice of Panel Decision from Pre-Appeal Brief Review dated Jul. 16, 2010 in U.S. Appl. No. 11/609,561, 2 pages.
Notice of Allowance dated Sep. 14, 2010 in U.S. Appl. No. 11/609,561, 7 pages.
Office Action dated Sep. 30, 2008 in U.S. Appl. No. 11/358,920, 34 pages.
Response to Office Action filed Dec. 19, 2008 in U.S. Appl. No. 11/356,920, 23 pages.
Notice of Allowance dated Apr. 20, 2009 in U.S. Appl. No. 11/356,920, 10 pages.
Office Acton dated Dec. 12. 2007 in U.S. Appl. 10/512,687, 20 pages.
Response to Office Action filed on Jun. 9, 2008 in U.S. Appl. No. 10/512,687, 14 pages.
Office Action dated Sep. 10, 2008 in U.S. Appl. No. 10/512,687, 16 pages.
Response to Office Action filed on Dec. 9, 2008 in U.S. Appl. No. 10/512,687, 13 pages.
Advisory Action dated Jan. 7, 2009 in U.S. Appl. No. 10/512,687, 3 pages.
Response to Office Action flied on Feb. 10, 2009 U.S. Appl. No. 10/512,687, 23 pages.
Office Action dated Apr. 3, 2009 in U.S. Appl. No. 10/512,687, 16 pages.
Response to Office Action filed on Jul. 28, 2009 in U.S. Appl. No. 10/512,687, 18 pages.
Office Action dated Nov. 18, 2009 in U.S. Appl. No. 10/512,687, 20 pages.
Response to Office Action filed on Mar. 15, 2010 in U.S. Appl. No. 10/512,687, 19 pages.
Office Action dated Oct. 20, 2011 in U.S. Appl. No. 10/512,687, 28 pages.
Response to Office Action filed on Jan. 10, 2012 in U.S. Appl. No. 10/512,687, 14 pages.
Notice of Allowance dated Apr. 27, 2012 in U.S. Appl. No. 10/512,687, 7 pages.
Office Action dated Sep. 23, 2008 in U.S. Appl. No. 11/536,215, 8 pages.
Response to Office Action filed on Nov. 19, 2008 in U.S. Appl. No. 11/536,215, 10 pages.
Notice of Allowance dated Dec. 10, 2008 in U.S. Appl. No. 11/536,215, 9 pages.
Office Action dated Aug. 19, 2008 in U.S. Appl. No. 11/536,233, 8 pages.
Response to Office Action flied on Sep. 17, 2008 in U.S. Appl. No. 11/536,233, 9 pages.
Office Action dated Oct. 27, 2008 in U.S. Appl. No. 11/536,233, 5 pages.
Response to Office Action filed on Nov. 25, 2008 in U.S. Appl. No. 11/536,233, 11 pages.
Office Action dated Mar. 6, 2009 in U.S. Appl. No. 11/530,233, 29 pages.
Response to Office Action filed on Jun. 3, 2009 in U.S. Appl. No. 11/536,233, 16 pages.
Notice of Aliowance dated Sep. 16, 2009 in U.S. Appl. No. 11/263,233, 3 pages.
Office Action dated Apr. 23, 2009 in U.S. Appl. No. 11/536,160, 21 pages.
Response to Office Action flied on Jun. 9, 2009 in U.S. Appl. No. 11/536,160, 12 pages.
Notice of Allowance dated Aug. 31, 2009 in U.S. Appl. No. 11/536,160, 19 pages.
Office Action dated Mar. 25, 2010 in U.S. Appl. No. 11/964,168, 17 pages.
Response to Office Action flied on Apr. 13, 2010 in U.S. Appl. No. 11/964,168, 10 pages.
Notice of Allowance dated Jul. 8, 2010 in U.S. Appl. No. 11/964,168, 8 pages.

* cited by examiner

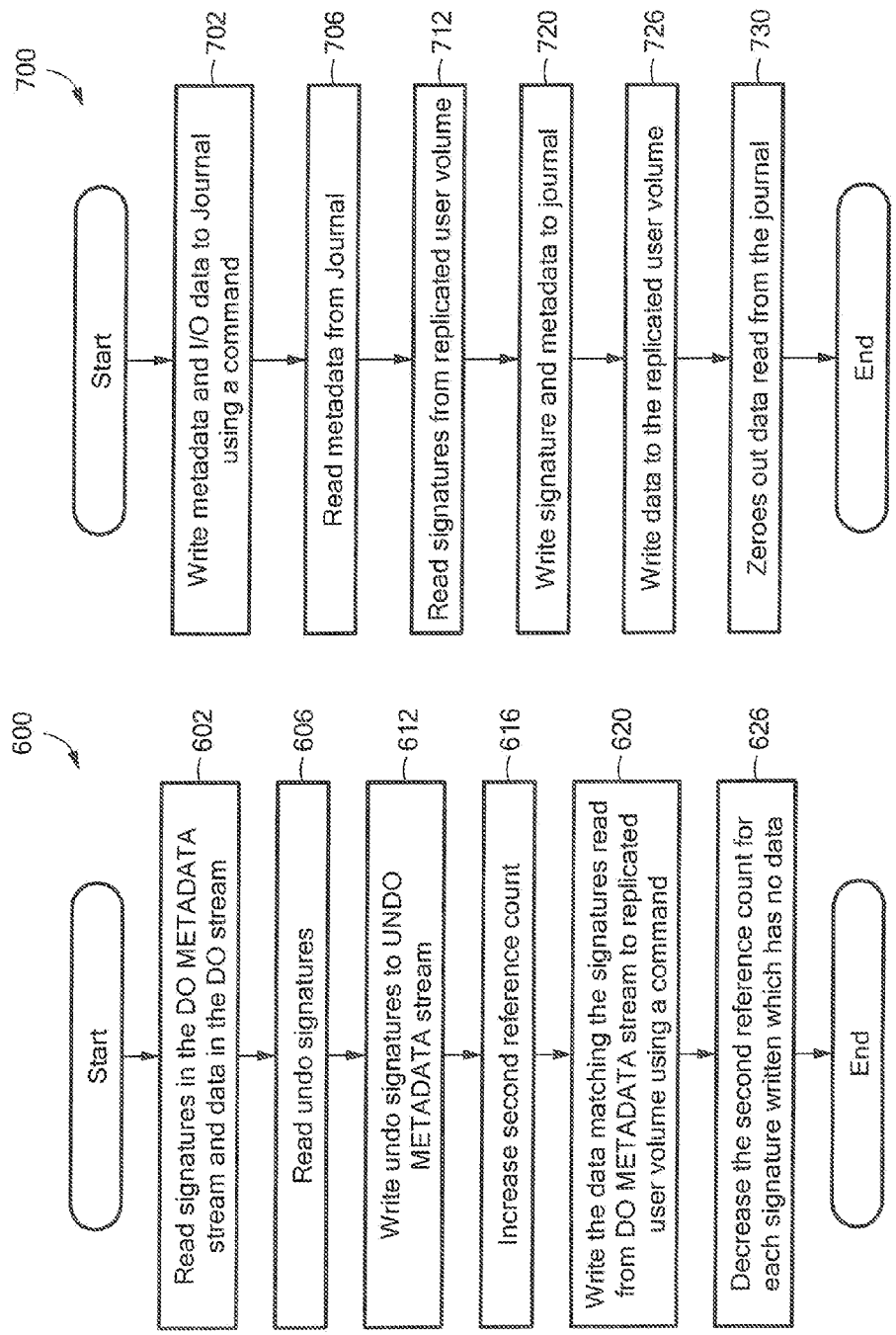

CONTINUOUS DATA PROTECTION USING DEDUPLICATION-BASED STORAGE

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes intercepting a write I/O to a first storage volume of a first storage array having a deduplication-based storage functionality, sending metadata and a signature to a replication data protection appliance and increasing a first reference count representing the data in the write I/O stored at the first storage array if the signature is written to the first journal.

In another aspect, an apparatus includes electronic hardware circuitry configured to intercept a write I/O to a first storage volume of a first storage array having a deduplication-based storage functionality, send metadata and a signature to a replication data protection appliance and increase a first reference count representing the data in the write I/O stored at the first storage array if the signature is written to the first journal.

In a further aspect, an article includes a non-transitory computer-readable medium that stores computer-executable instructions. The instructions cause a machine to intercept a write I/O to a first storage volume of a first storage array having a deduplication-based storage functionality, send metadata and a signature to a replication data protection appliance and increase a first reference count representing the data in the write I/O stored at the first storage array if the signature is written to the first journal.

BRIEF DESCRIPTION OF THE DRAWINGS

FIG. 6 is a flowchart of an example of a process to apply data from a journal to the replication storage volume.

FIG. 7 is a flowchart of an example of a process to use a journal with a deduplication-based storage using a 5-stage journaling.

DETAILED DESCRIPTION

Figure 1:
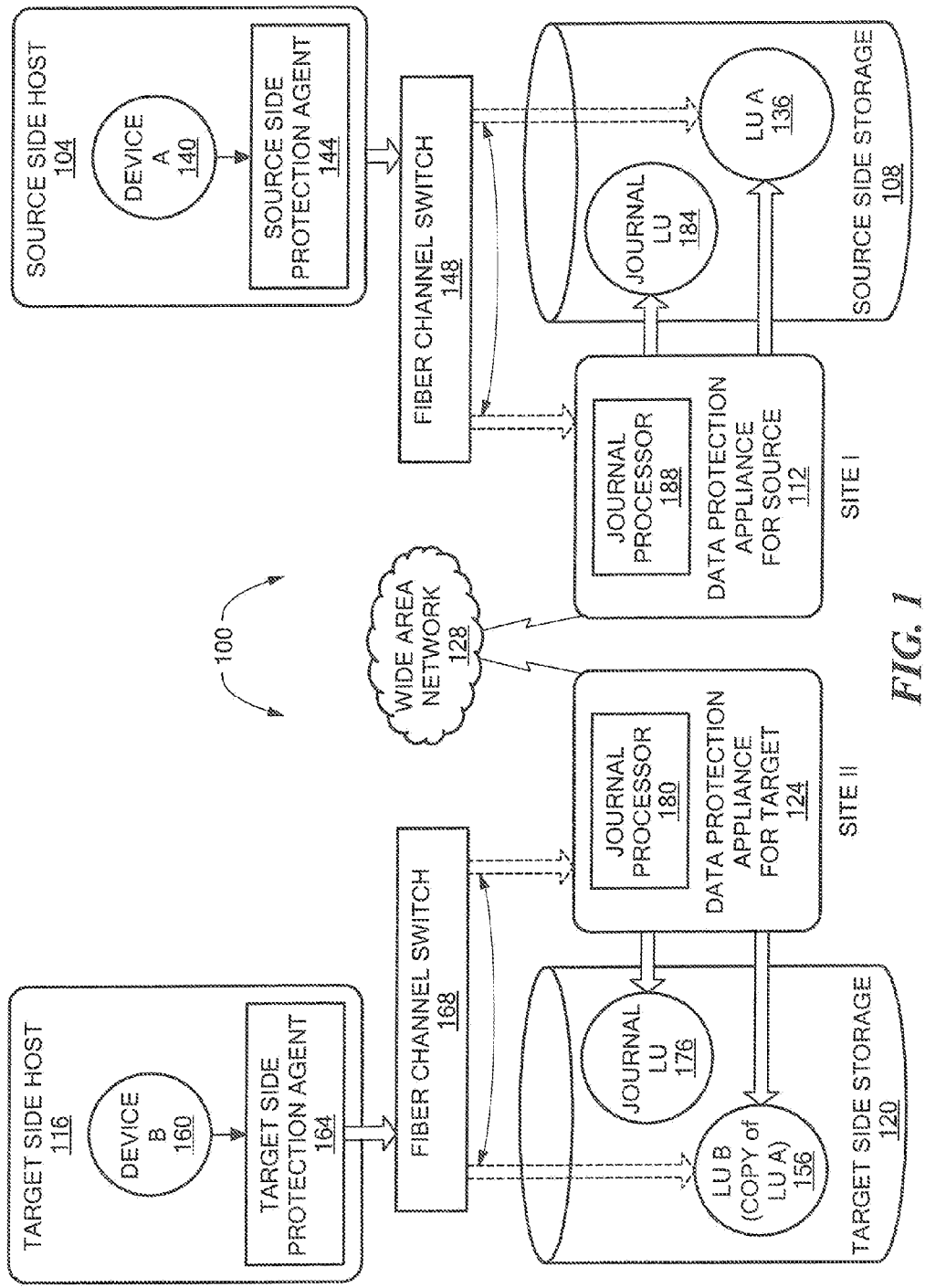
FIG. 1 is a block diagram of an example of a data protection system.

Described herein is an approach to use deduplication-based storage volumes in a replication system. In this approach, data is stored only once in the replication system instead of being duplicated in a storage volume and in a journal. Moving write I/Os from the journal to the volume, and UNDO data from the volume to the journal is done just by copying the signature and handling reference counts. Thus, the journal can be kept on a storage which is not the deduplication-based storage, as deduplication-based storage is very expensive and a journal is sequential in nature and works well on any storage array. The techniques described herein save network bandwidth, storage bandwidth and storage capacity.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 2:
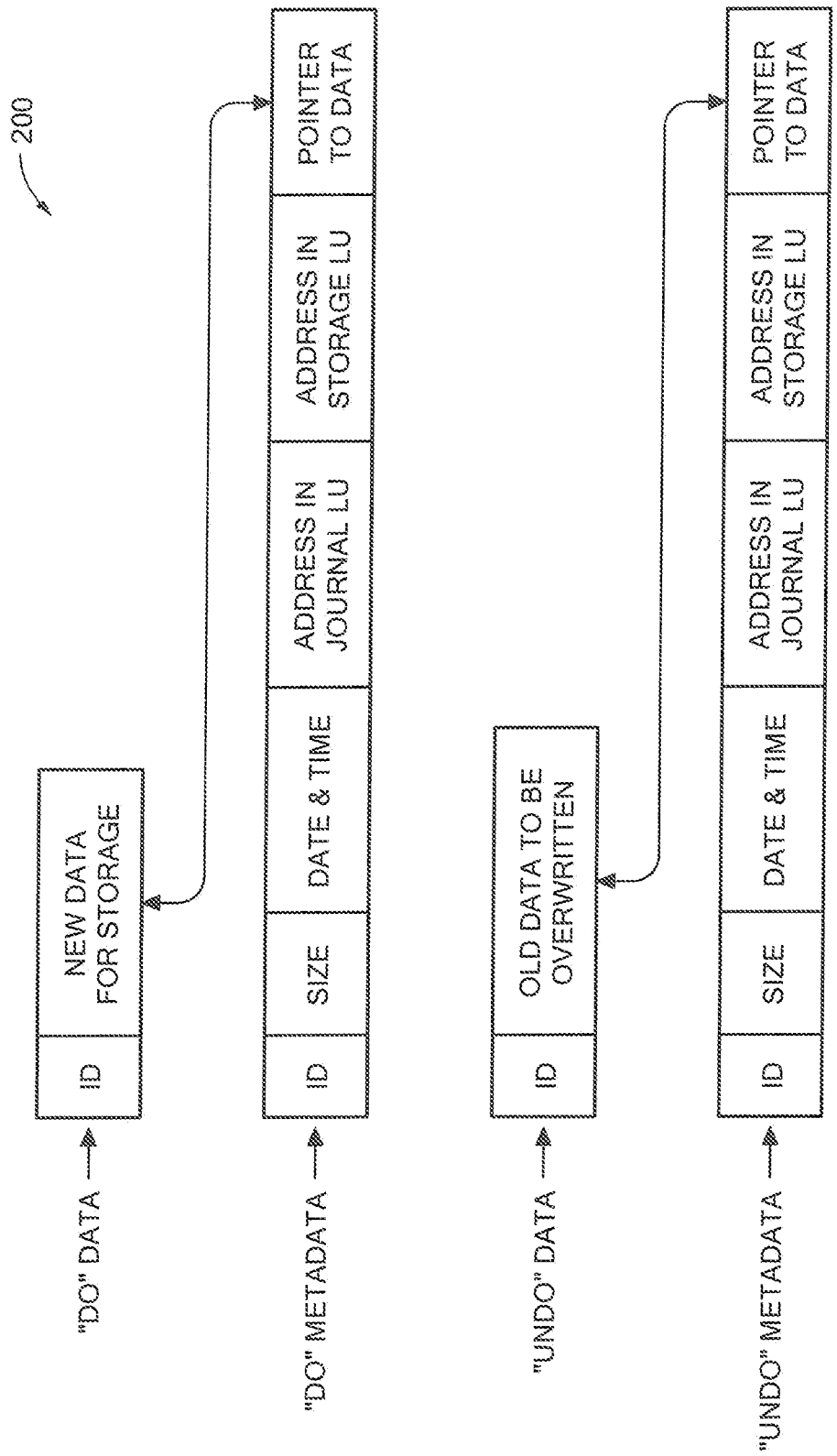
FIG. 2 is an illustration of an example of a journal history of write transactions for a storage system.

Before describing a replication system that includes a deduplication based storage volume, an example replication system is first described in FIGS. 1 and 2.

An Example of a Replication System

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface.

Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
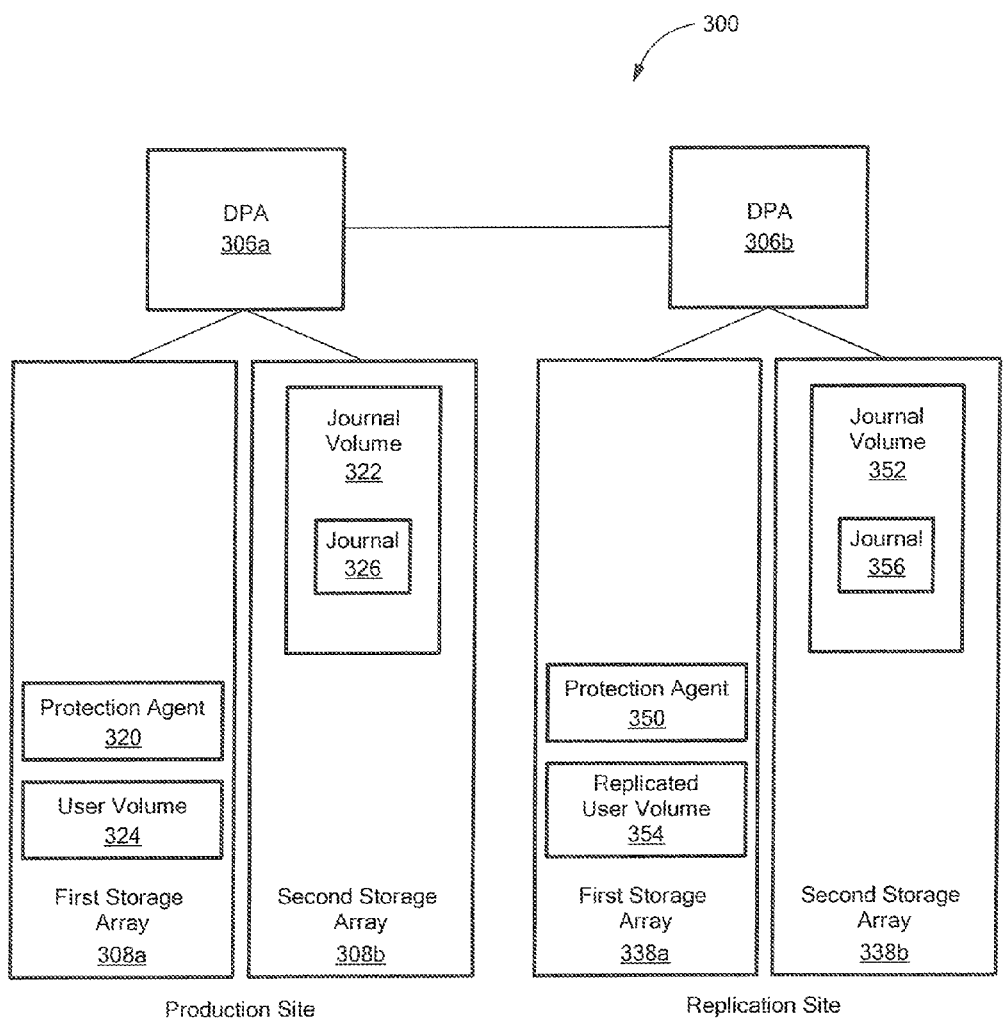
FIG. 3 is a block diagram of another example of a replication system using deduplication based storage.

Referring to FIG. 3, a replication system 300 includes a DPA 306a, a first storage array 308a and a second storage array 308b at the production site and a DPA 306b, a first storage array 338a and a second storage array 338b at the replication site.

The first storage array 308a includes a data protection agent 320 and a user volume 324. The second storage array 308b includes a journal volume 326. The first storage array 338a includes a data protection agent 350 and a replicated user volume 354. The second storage array 338b includes a journal volume 356.

In one example, the journals 326, 356 are drives on a standard-type storage array such as serial ATA (SATA), FC or flash drives. In other example journals 326,356 may also be stored on first storage arrays 308a, 338a respectively.

The first storage arrays 308a, 338a include deduplication-based storage volumes. Deduplication-based storage is a storage paradigm that utilizes deduplication technology at the very core of the storage system. For example, I/Os arriving to the deduplication-based storage volume are divided into fixed chunks of data (e.g., 4K). A cryptographically strong signature or fingerprint is calculated for each data chunk. The uniqueness of this signature is the key factor of this kind of storage so that a data chunk is uniquely identified by its data signature. The deduplication-based storage volumes are sequences of the signature data, with the actual data stored separately. Or viewed in another way, the storage data is a big persistent hash table with the signatures used as keys, and the volumes are sequences of those keys.

Thus, actual data may be stored only once in a system while other components in the system references the data by its signature. This reference relates not only to the actual volume storage of the data, but may also relate to memory caches, snapshots, internal copying of data and so forth. The actual data blocks are not copied but rather their signature is. A reference count is kept on each data block, which counts the number of references to that block. When the block is no longer referenced it is removed from the storage.

In one example, the first storage arrays 308a, 338a are flash drives. In order to improve efficiency, the data lookup by signature should be very fast. Since the data lookup is a random access operation by nature it is beneficial that flash technology be used. Deduplication-based storage volumes utilize the high I/O operations per second (IOPS) and random access nature of flash technology. The deduplication complements flash technology limitations by providing a compact representation of the data, and efficiently utilizing the relatively expensive flash capacity. The combination of flash drives and deduplication based storage in the front end forms a very high performance system.

Figure 4:
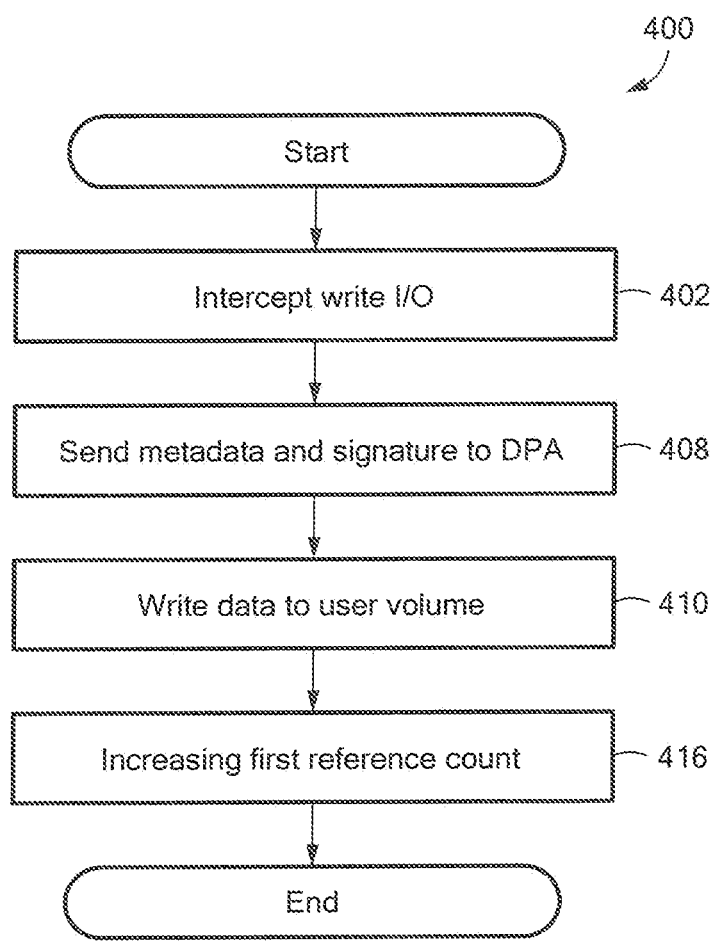
FIG. 4 is a flowchart of an example of a process to intercept an I/O request by the protection agent.

Referring to FIG. 4, an example of a process to handle write I/Os at the data protection agent is a process 400. Process 400 intercepts a write I/O (402). For example, the data protection agent 320 intercepts the write I/O from a host (not shown) writing to the user volume 324 on the first storage array 308a.

Process 400 sends the metadata and the signature to the DPA (408). For example, the data protection agent 320 sends the metadata and the signature to the DPA 306a using an SCSI command.

Process 400 writes the data (410). For example, the data protection agent 320 writes the data from the write I/O to the user volume 308a.

Process 400 increasing a first reference count (416). The first reference count is increased in order to avoid erasure of the I/O data until it arrives at the replica site. For example, the data protection agent 320 increases the first reference count to a signature using an internal API in the storage array 308a. In one example, the signature represents a hash value of the I/O data.

When the write I/O arrives at the user volume 324, a signature of the I/O is calculated. If the signature does not exist the data is added to the storage and the signature is added to a signature table (not shown) stored in the memory of the deduplication-based storage.

If the data matches a signature that exists somewhere in the first storage array 308a, a location in the user volume 324 is added that points to this signature and the first reference count for the I/O data is increased by 1.

Since the I/O data is not to be erased before it reaches the replicated user volume 354, a second reference count will be increased so the I/O data will not be erased even if the I/O data is overwritten.

In one example, I/O data associated with a reference count that is greater than zero is not erased from a storage array.

Figure 5:
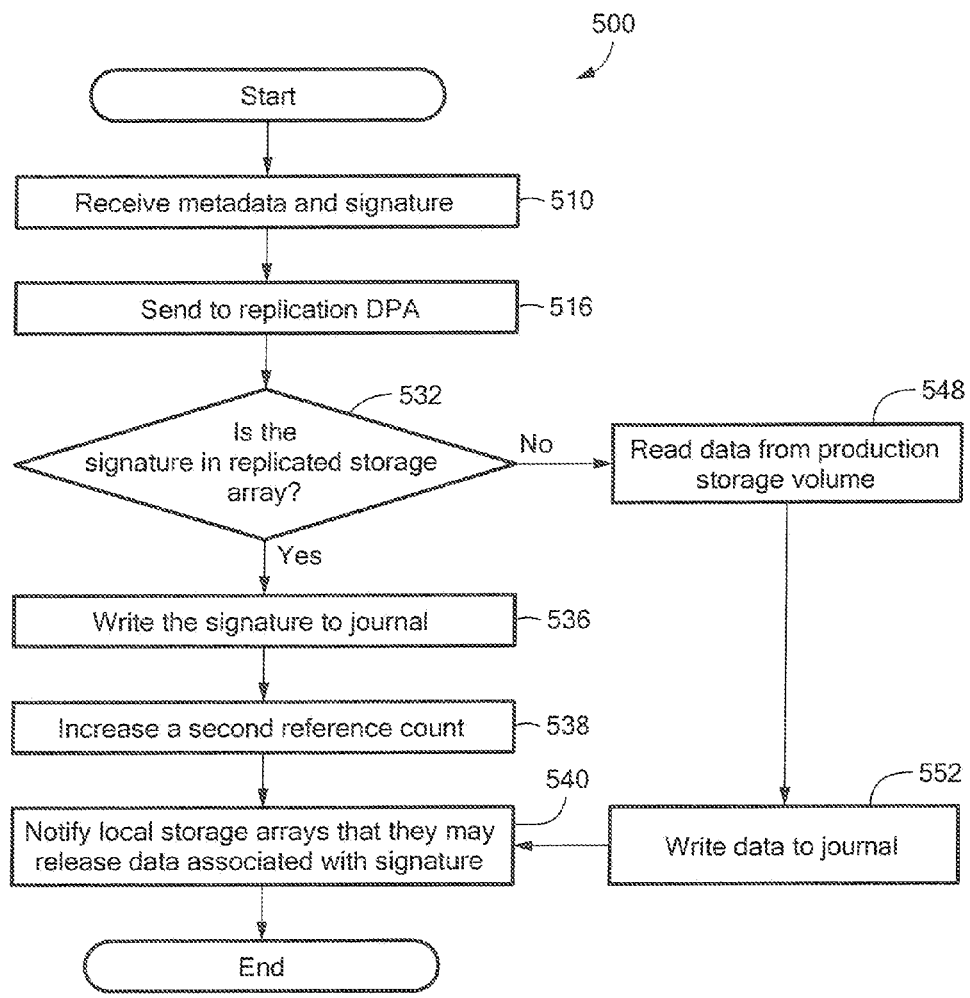
FIG. 5 is a flowchart of an example of a process to handle a signature at the data protection appliance.

Referring to FIG. 5, an example of process to handle the metadata and the signature from the protection agent is the process 500. Process 500 receives the metadata and the signature (510) and sends the metadata and the signature to the replication DPA (516). For example, the DPA 308a receives the metadata and the signature from the protection agent 320 and sends the metadata and the signature to the DPA 306b.

Process 500 determines if the signature is stored in the replicated storage array (532). For example, the DPA 306b determines if the signature is stored at the first storage array 338a. In one example, determining if the first storage array 338a has the signature can be done through a vendor specific SCSI command.

In one example, a write signature command may be defined which gets a LUN, offset and signature and writes the data matching the signature to the offset if the data exists and if not, returns a NOT_EXIST status if the signature does not exist at the storage.

In one example, the write signature command may include one or more of the following parameters:
1. LBA (logical block address) for the target of the write
2. Number of blocks of the IO
3. Signature granularity
4. 16 or 32 byte of hash value (or signature), for each signature granularity block (e.g., if granularity is 16 blocks and 64 blocks are written, then there will be 4 signatures each of 16 or 32 bytes).

The signature or hash value size (e.g., 16 byte or 32 byte or any other size) is large enough so that there is very high probability that if two sets of data have the same signature then the two sets of data are identical.

In one particular example, a write signature command (with parameters: LUN A, offset B, 16 blocks, 16 blocks granularity, signature X) means that the storage array will search to determine if there is a data 16 blocks in size stored anywhere, with signature equal to X. If the answer is yes, the storage array will copy the data it found into LUN A offset B, and return a success status message. If the answer is negative, the storage array will return a signature mismatch status, or any other failure status. If the storage array is de-duplication-based storage the storage array will just move a LUN to point to the signature X which points to the data which the signature matches.

Process 500 writes the signature to the journal at the replication site if the signature is stored in the replication storage array (536). For example, the DPA 306b writes the signature to the journal 356 at the second storage array 338b if the signature is stored in the first storage array 338a.

Process 500 increases a second reference count of the signature at the replica site (538). For example, DPA 306b increases the second reference count at the replication site.

Process 500 notifies local storage arrays that data associated with the signature may be released (540). For example, if the first reference count is decremented to zero then the data associated with the signature may be erased at the first storage volume. Once the signature is safely stored at the first storage array 338a only then can data associated with the signature at the first storage volume 308a be allowed to be erased.

If the signature of the data does not already exist on the replica site, process 500 reads data from the production storage volume (548) and writes the data to the journal at the replication site (552). For example, the DPA 306b reads the data (through the DPA 306a) in the user volume 324 and writes the data read to the journal 356. Process 500 then performs processing block 540.

In some examples, if the replica journal 356 is stored on the deduplication-based storage 338a, the reference count at the replica volume may not be directly increased in processing block 538, but rather the reference count is increased by having the data written to the replica journal 356 using a write signature command.

Referring to FIG. 6, one example of a process to apply data from the journal to the replication storage volume is a process 600. For locations which a signature exists at the replication site the DO METADATA stream includes the signature of the data. For locations which the signature does not exist, the DO stream includes also the data.

Process 600 reads signatures in the DO METADATA stream and data in the DO stream (602). For example, the DPA 306b reads from the journal 322b signatures in the DO METADATA stream and data that has no signature in the DO stream.

Process 600 reads undo signatures from the replica user volume 354 (606). The undo signatures are signatures for those locations that will be overwritten. For example, the DPA 306b reads undo signatures.

Process 600 writes the undo signatures to the UNDO METADATA stream (612) and increases the second reference count of the signatures at the replica storage (616).

A reference count of a signature is increased or decreased using some vendor specific SCSI command, which includes the signature and whether to increase or decrease the count. In some implementations the reference count may be on a per volume base, while in others, the reference count may be global to the storage.

For example, the DPA 306b writes the undo signatures to the UNDO METADATA stream in the journal 352 and increases the second reference count at the first storage array 338a at the replication site.

Process 600 writes the data matching the signatures read from the DO METADATA stream to the replicated user volume using a command (620). For example, the DPA 306b writes the signatures read from the DO METADATA stream to the replicated user volume 354, using a vendor specific SCSI command, for example, using the write signature command. Since the first storage array 338a at the replication site has the data associated with the signature, a pointer can be moved from the offset of the volume to the data.

Process 600 decreases the second reference count for each signature written which has no data (626). For example, a signature for which the second reference count was increased at processing block 538 is now decreased.

In some examples, the DO stream can be stored in a deduplication-based storage array while the DO and UNDO METADATA streams can be stored in any other storage-type array. In this case, the data in the DO stream does not need to be read, because the replication storage array (e.g., first storage array 338a) already has the data stored. Thus, only the signature is written to the replication storage array (e.g., first storage array 338a).

In another example, all streams (DO, DO METADATA, UNDO, and UNDO METADATA streams) from a journal are stored at deduplication-based storage. In this case there is no need to increase and decrease a reference count, instead, the signatures can be kept at the UNDO METADATA stream and the DO METADATA stream, while the reference counts are changed by writing data to the DO stream and the UNDO stream by using the write signature SCSI command. When data should be erased from either the DO or UNDO streams a SCSI PUNCH command may be used to reduce the reference count for the data.

In other examples, when data is erased from the UNDO METADATA stream as the replica deduplication-based storage gets full, the reference count for erased signatures is decreased.

Referring to FIG. 7, an example of a process to use the journal with a deduplication-based storage using a 5-stage journaling is a process 700. In particular, process 700 is a process to apply data from the journal to the replica volume when the journal is stored completely on a deduplication-based storage. 5-stage journaling is described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Process 700 writes to a journal using a command (702). For example, the DPA 306b writes metadata to a DO META-DATA stream at the journal 356 and writes write I/O data to a DO stream at the journal 356 using a write signature command.

A write signature command is a command which gets an offset and a signature, and if the deduplication-based storage contains data matching the signature, data is written to the offset indicated in the command. Otherwise a special status indicating NOT_EXIST is returned.

Process 700 reads metadata from the journal (706). For example, the DPA 306b reads metadata from the DO META-DATA stream in the journal 356.

Process 700 reads signatures from volume (712). For example, the DPA 306a reads signatures from the replicated user volume 354 for locations read in DO METADATA stream in processing block 706.

Process 700 writes to the journal (720). For example, the DPA 306b writes the signatures and metadata to the UNDO METADATA stream and writes data to the UNDO stream using a write signature command.

Process 700 writes data to the volume (726) and zeros out data read from the journal so that space may be saved (730). For example, zeroing may be done using SCSI unmap command (punch). For example, DPA 306b writes data read as a list of signatures from the DO METADATA stream to the replicated user volume 354 using a write signature command and zeroes out the data read from the DO stream.

Figure 8:
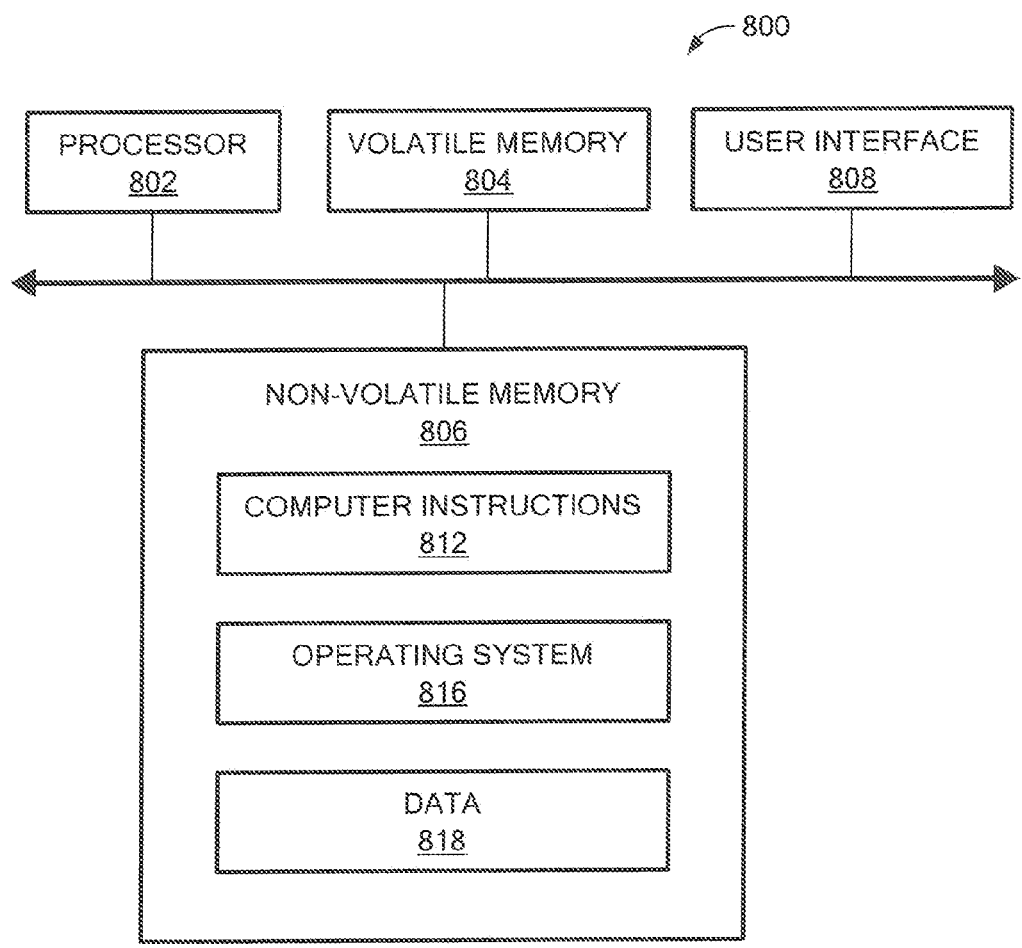
FIG. 8 is a computer on which any of the processes of FIGS. 4 to 7 may be implemented.

Referring to FIG. 8, in one example, a computer 800 includes a processor 802, a volatile memory 804, a non-volatile memory 806 (e.g., hard disk) and the user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., processes 400, 500, 600 and 700).

The processes described herein (e.g., processes 400, 500, 600 and 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 500, 600 and 700 are not limited to the specific processing order of FIGS. 4 to 7, respectively. Rather, any of the processing blocks of FIGS. 4 to 7 may be re-ordered, combined or removed, performed in parallel or in serial, as necessary, to achieve the results set forth above.

In other examples, one of ordinary skill in the art would recognize that increasing and decreasing reference counts may be done opposite as described. For example, the reference count can be decreased and then increased. One of ordinary skill in the art would also recognize that a value is changed from a first state to a second state when the signature data is needed to avoid erasure of the data and when the data is no longer needed the value returns to a first state.

The processing blocks (for example, in the processes 400, 500, 600 and 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A computer implemented method comprising:
   intercepting a write Input/Output (I/O) to a first storage volume of a first storage array having a deduplication-based storage functionality;
   sending, by using a processor, metadata and a signature to a replication data protection appliance;
   increasing a first reference count representing the data in the write I/O stored at the first storage array if the signature is written to the first journal;
   writing the signature to a second journal if the signature is in a second storage array having a deduplication-based storage functionality, the second storage array comprising a second storage volume used to replicate the first storage volume;
   increasing a second reference count representing the data of the I/O at the second storage array if the signature is in the second storage array;
   reading the data from the I/O from the first storage volume if the signature is not in the second storage volume;
   writing the data from the I/O to the second journal if the signature is not in the second storage volume;
   notifying the first storage array to decrease the first reference count and the second storage array to decrease the second storage reference count if the signature or the data is written to the second journal;
   reading signatures in a DO METADATA stream in the second journal;
   reading data in a DO stream in the second journal that have no signatures in the DO stream;
   reading undo signatures from the second storage volume;
   writing the undo signatures to an UNDO METADATA stream in the second journal;
   increasing a second reference count of the data at the second storage array;
   writing the data matching the signatures read from the DO METADATA stream to the second storage volume using a command, the command using a location in the second journal and a signature and writing the I/O data matching the signature to the location in the second journal; and
   decreasing the second reference count for each signature written which has no corresponding I/O data.

2. The method of claim 1, further comprising writing data from the write I/O to the first storage volume.

3. The method of claim 1, further comprising notifying the first storage array to release data associated with the signature after either the signature or the data is written to the second journal.

4. A computer implemented method comprising:
   intercepting a write Input/Output (I/O) to a first storage volume of a first storage array having a deduplication-based storage functionality;
   sending, by using a processor, metadata and a signature to a replication data protection appliance;
   increasing a first reference count representing the data in the write I/O stored at the first storage array if the signature is written to the first journal;
   writing the signature to a second journal if the signature is in a second storage array having a deduplication-based storage functionality, the second storage array comprising a second storage volume used to replicate the first storage volume;
   increasing a second reference count representing the data of the I/O at the second storage array if the signature is in the second storage array;
   reading the data from the I/O from the first storage volume if the signature is not in the second storage volume;
   writing the data from the I/O to the second journal if the signature is not in the second storage volume;
   notifying the first storage array to decrease the first reference count and the second storage array to decrease the second storage reference count if the signature or the data is written to the second journal;
   writing metadata to a DO METADATA stream in the second journal;
   writing I/O data to a DO stream in the second journal using a command, the command using a location in the second journal and a signature and writing the I/O data matching the signature to the location in the second journal;
   reading the metadata from the DO METADATA stream;
   reading signatures from the second storage volume for locations read in the DO METADATA stream;
   writing the signatures and the metadata to the UNDO METADATA stream in the second journal;

writing I/O data to the UNDO stream in the second journal;
writing the I/O data from the DO METADATA stream to the second storage volume; and zeroing out the data read from the DO stream.

5. The method of claim 4, further comprising writing data from the write I/O to the first storage volume.

6. The method of claim 4, further comprising notifying the first storage array to release data associated with the signature after either the signature or the data is written to the second journal.

7. An apparatus, comprising:
electronic hardware circuitry configured to:
intercept a write Input/Output (I/O) to a first storage volume of a first storage array having a deduplication-based storage functionality;
send, by using a processor, metadata and a signature to a replication data protection appliance;
increase a first reference count representing the data in the write I/O stored at the first storage array if the signature is written to the first journal;
write the signature to a second journal if the signature is in a second storage array having a deduplication-based storage functionality, the second storage array comprising a second storage volume used to replicate the first storage volume;
increase a second reference count representing the data of the I/O at the second storage array if the signature is in the second storage array;
read the data from the I/O from the first storage volume if the signature is not in the second storage volume;
write the data from the I/O to the second journal if the signature is not in the second storage volume;
notify the first storage array to decrease the first reference count and the second storage array to decrease the second storage reference count if the signature or the data is written to the second journal;
read signatures in a DO METADATA stream in the second journal;
read data in a DO stream in the second journal that have no signatures in the DO stream;
read undo signatures from the second storage volume;
write the undo signatures to an UNDO METADATA stream in the second journal;
increase a second reference count of the data at the second storage array; write the data matching the signatures read from the DO METADATA stream to the second storage volume using a command, the command using a location in the second journal and a signature and writing the I/O data matching the signature to the location in the second journal; and
decrease the second reference count for each signature written which has no corresponding I/O data.

8. The apparatus of claim 7 wherein the circuitry comprises at least one of a processor, a memory, a programmable logic device or a logic gate.

9. The apparatus of claim 7, further comprising circuitry configured to write data from the write I/O to the first storage volume.

10. The apparatus of claim 7, further comprising circuitry configured to notify the first storage array to release data associated with the signature after either the signature or the data is written to the second journal.

11. An apparatus, comprising:
electronic hardware circuitry configured to:
intercept a write Input/Output (I/O) to a first storage volume of a first storage array having a deduplication-based storage functionality;
send, by using a processor, metadata and a signature to a replication data protection appliance;
increase a first reference count representing the data in the write I/O stored at the first storage array if the signature is written to the first journal;
write the signature to a second journal if the signature is in a second storage array having a deduplication-based storage functionality, the second storage array comprising a second storage volume used to replicate the first storage volume;
increase a second reference count representing the data of the I/O at the second storage array if the signature is in the second storage array;
read the data from the I/O from the first storage volume if the signature is not in the second storage volume;
write the data from the I/O to the second journal if the signature is not in the second storage volume;
notify the first storage array to decrease the first reference count and the second storage array to decrease the second storage reference count if the signature or the data is written to the second journal;
write metadata to a DO METADATA stream in the second journal;
write I/O data to a DO stream in the second journal using a command, the command using a location in the second journal and a signature and writing the I/O data matching the signature to the location in the second journal;
read the metadata from the DO METADATA stream;
reading signatures from the second storage volume for locations read in the DO METADATA stream;
write the signatures and the metadata to the UNDO METADATA stream in the second journal;
write I/O data to the UNDO stream in the second journal;
write the I/O data from the DO METADATA stream to the second storage volume; and zero out the data read from the DO stream.

12. The apparatus of claim 11, further comprising circuitry configured to write data from the write I/O to the first storage volume.

13. The apparatus of claim 11, further comprising circuitry configured to notify the first storage array to release data associated with the signature after either the signature or the data is written to the second journal.

14. An article comprising:
a non-transitory computer-readable medium that stores computer-executable instructions, the instructions causing a machine to:
intercept a write Input/Output (I/O) to a first storage volume of a first storage array having a deduplication-based storage functionality;
send, by using a processor, metadata and a signature to a replication data protection appliance; and
increase a first reference count representing the data in the write I/O stored at the first storage array if the signature is written to the first journal;
write the signature to a second journal if the signature is in a second storage array having a deduplication-based storage functionality, the second storage array comprising a second storage volume used to replicate the first storage volume;
increase a second reference count representing the data of the I/O at the second storage array if the signature is in the second storage array;
read the data from the I/O from the first storage volume if the signature is not in the second storage volume;
write the data from the I/O to the second journal if the signature is not in the second storage volume;

notify the first storage array to decrease the first reference count and the second storage array to decrease the second storage reference count if the signature or the data is written to the second journal;
read signatures in a DO METADATA stream in the second journal;
read data in a DO stream in the second journal that have no signatures in the DO stream;
read undo signatures from the second storage volume;
write the undo signatures to an UNDO METADATA stream in the second journal;
increase a second reference count of the data at the second storage array;
write the data matching the signatures read from the DO METADATA stream to the second storage volume using a command, the command using a location in the second journal and a signature and writing the I/O data matching the signature to the location in the second journal; and
decrease the second reference count for each signature written which has no corresponding I/O data.

15. The article of claim 14, further comprising instructions causing the machine to write data from the write I/O to the first storage volume.

16. The article of claim 14, further comprising instructions causing the machine to notify the first storage array to release data associated with the signature after either the signature or the data is written to the second journal.

17. An article comprising:
a non-transitory computer-readable medium that stores computer-executable instructions, the instructions causing a machine to:
intercept a write Input/Output (I/O) to a first storage volume of a first storage array having a deduplication-based storage functionality;
send, by using a processor, metadata and a signature to a replication data protection appliance;
increase a first reference count representing the data in the write I/O stored at the first storage array if the signature is written to the first journal;
write the signature to a second journal if the signature is in a second storage array having a deduplication-based storage functionality, the second storage array comprising a second storage volume used to replicate the first storage volume;
increase a second reference count representing the data of the I/O at the second storage array if the signature is in the second storage array;
read the data from the I/O from the first storage volume if the signature is not in the second storage volume;
write the data from the I/O to the second journal if the signature is not in the second storage volume;
notify the first storage array to decrease the first reference count and the second storage array to decrease the second storage reference count if the signature or the data is written to the second journal;
write metadata to a DO METADATA stream in the second journal;
write I/O data to a DO stream in the second journal using a command, the command using a location in the second journal and a signature and writing the I/O data matching the signature to the location in the second journal;
read the metadata from the DO METADATA stream;
reading signatures from the second storage volume for locations read in the DO METADATA stream;
write the signatures and the metadata to the UNDO METADATA stream in the second journal;
write I/O data to the UNDO stream in the second journal;
write the I/O data from the DO METADATA stream to the second storage volume; and zero out the data read from the DO stream.

18. The article of claim 17, further comprising instructions causing the machine to write data from the write I/O to the first storage volume.

19. The article of claim 17, further comprising instructions causing the machine to notify the first storage array to release data associated with the signature after either the signature or the data is written to the second journal.

* * * * *